April 3, 1962 S. W. ALDERSON 3,027,655

SYNTHETIC CASUALTY

Filed Sept. 17, 1959 6 Sheets-Sheet 1

INVENTOR.
SAMUEL W. ALDERSON
BY John P. Chandler
HIS ATTORNEY.

April 3, 1962 S. W. ALDERSON 3,027,655

SYNTHETIC CASUALTY

Filed Sept. 17, 1959 6 Sheets-Sheet 2

INVENTOR.
SAMUEL W. ALDERSON
BY
John P. Chandler
HIS ATTORNEY.

April 3, 1962 S. W. ALDERSON 3,027,655

SYNTHETIC CASUALTY

Filed Sept. 17, 1959 6 Sheets-Sheet 3

INVENTOR.
SAMUEL W. ALDERSON
BY John P. Chandler
HIS ATTORNEY.

April 3, 1962 S. W. ALDERSON 3,027,655

SYNTHETIC CASUALTY

Filed Sept. 17, 1959 6 Sheets-Sheet 4

INVENTOR.
SAMUEL W ALDERSON
BY John P. Chandler
HIS ATTORNEY.

April 3, 1962 S. W. ALDERSON 3,027,655

SYNTHETIC CASUALTY

Filed Sept. 17, 1959 6 Sheets-Sheet 5

INVENTOR.
SAMUEL W ALDERSON
BY John P. Chandler
HIS ATTORNEY.

April 3, 1962 S. W. ALDERSON 3,027,655
SYNTHETIC CASUALTY
Filed Sept. 17, 1959 6 Sheets-Sheet 6

INVENTOR.
SAMUEL W ALDERSON
BY John P. Chandler
HIS ATTORNEY.

United States Patent Office 3,027,655

Patented Apr. 3, 1962

3,027,655

SYNTHETIC CASUALTY

Samuel W. Alderson, New York, N.Y., assignor to Alderson Research Laboratories, Inc., Long Island City, N.Y., a corporation of New York Filed Sept. 17, 1959, Ser. No. 840,623

3 Claims. (Cl. 35—17)

This invention relates to training manikins or dummies for first aid and other medical work and relates more particularly to a manikin simulating a seriously injured man whose various wounds may be treated by standard techniques of first aid and as such is intended to serve as a practice victim in first aid training classes.

An important object of the invention is to provide a portable manikin for first aid training and containing a variety of simulated wounds, some of grievous character, the manikin being independent of any base or supporting structure so that it can be operated in any body position and can be placed in a simulated accident scene. The manikin of the present invention is thus distinguished from all prior devices of this character which have been immovably mounted in one position only on a base. Also, in these earlier dummies the several injuries received their "blood" supply from a single pump, and if several injuries were being operated the blood would flow from each at the same rate, or if they were successively operated a new setting of the valve was required in order to simulate the actual flow from a particular type of injury. An open sump was used and hence the simulated blood had to be drained before it could be transported. The whole assembly was notably lacking in realistic operation and appearance and could obviously be used only for classroom work. It could not be used for field work where the students could unexpectedly discover a "casualty."

Another object of the invention is to provide a manikin which has the appearance of a living man so that it will evoke shock reactions which have been found essential for fully effective first aid training, particularly for the treatment of wounds expected in this atomic age.

A further object of the invention is to provide a dummy whose injury complement can be expanded readily by the use of injury moulages which are synthetic skin sections duplicating various injuries and which have blood lines to provide a flow of simulated blood.

The manikin of the present invention has a number of other particularly realistic features, including (1) blood flow-control means wherein a flow to a second injury may be commenced without reducing the flow to the first injury; (2) an "umbilical cord" connecting the manikin's various bleeding injuries to a flow-control unit, and a "service cord" connecting the flow-control unit to the pumping mechanisms; (3) a mechanical unit containing pumps and electrical controls; (4) a reservoir and associated tubing for storage and transmission of simulated blood to the pumping unit; (5) a presentation table and drain system; and (6) a by-pass system consisting of means for diverting a portion of the blood taken up by the pump directly back to the reservoir, as a result of which, if the pump is operating with all injuries off, the by-pass tube is circulating an appreciable volume of blood and additional increments of blood flow, due to the use of each injury, affect total pump flow to a much lesser degree than would otherwise be the case.

Other objects and advantages will presently appear or will become apparent as the specification proceeds.

Figure 1:
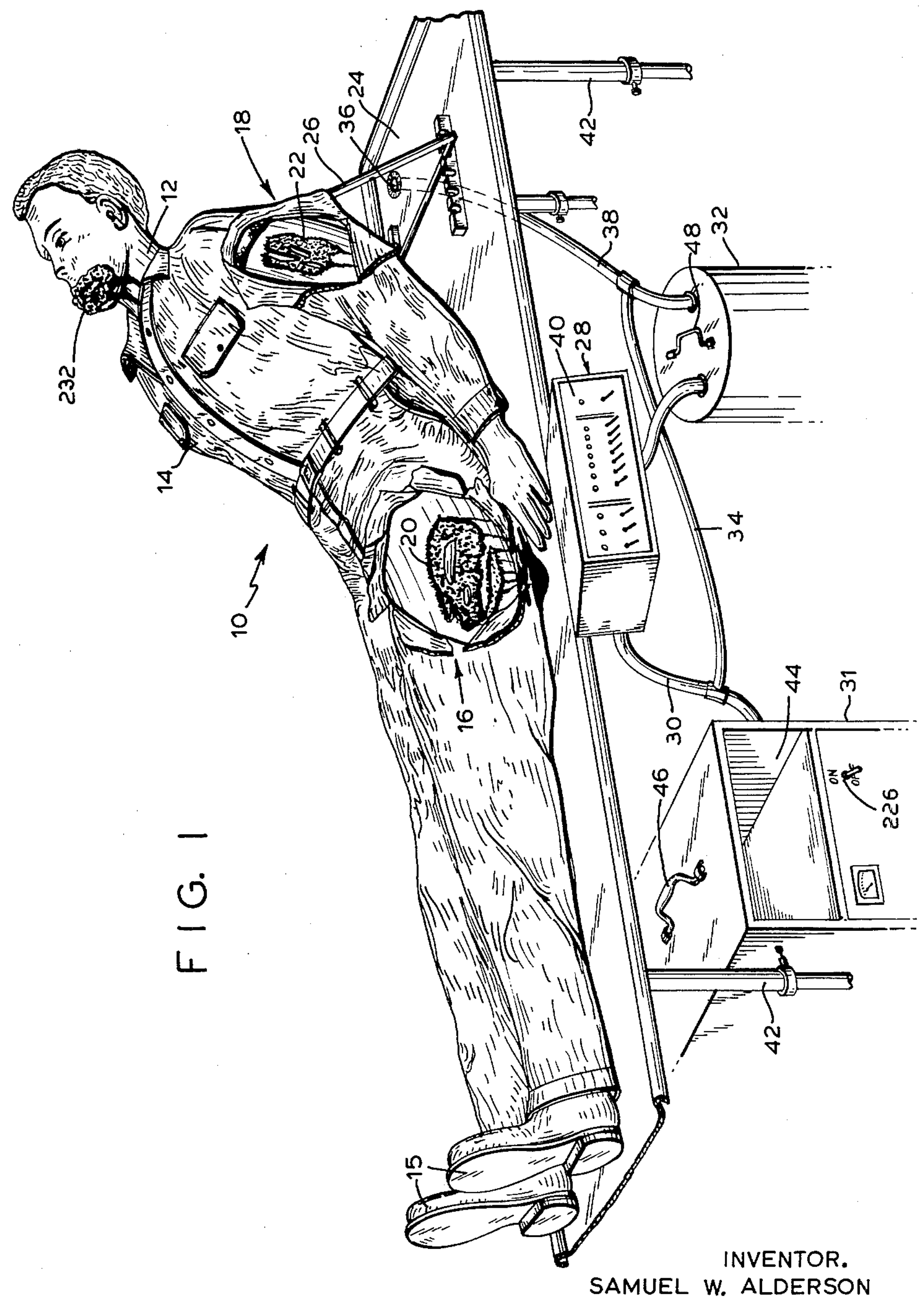
FIG. 1 is a perspective of a synthetic casualty embodying the present invention.
Figure 2:
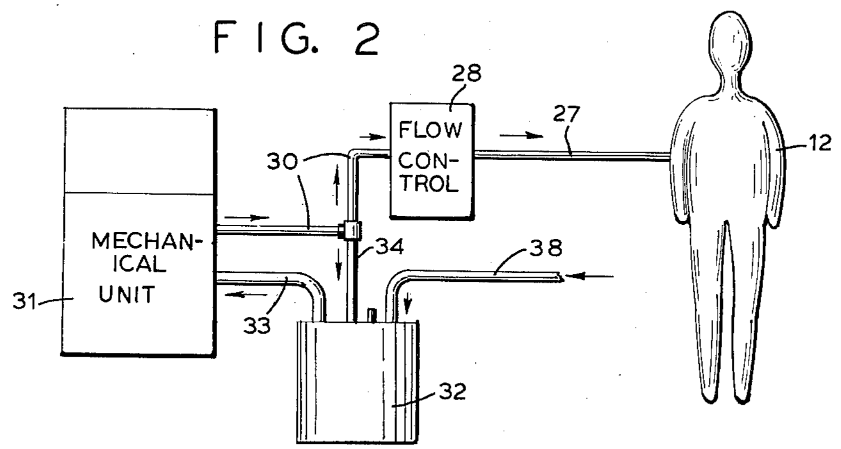
FIG. 2 is a schematic diagram showing the elements of control.

Referring now to FIG. 1 a synthetic casualty generally indicated 10 comprises a manikin 12 having suitable clothing 14 including shoes 15. The clothing is torn away at a point 16 on the leg and at a point 18 on the arm, exposing a leg injury 20 and an arm injury 22. The casualty 10 is resting in a reclining position upon a suitable table top 24. The head and shoulders are supported in an inclined position by a prop 26 which is adjustable for angle of incline. A schematic or condensed overall picture of the synthetic casualty is shown by FIG. 2. In order to further enhance the realistic simulation of a casualty the wounded portions are constructed so as to secrete a simulated blood. The manikin 12 receives a supply of synthetic blood through tubes contained in a flexible cable 27 which will hereafter be known as the umbilical cord.

Figure 3:
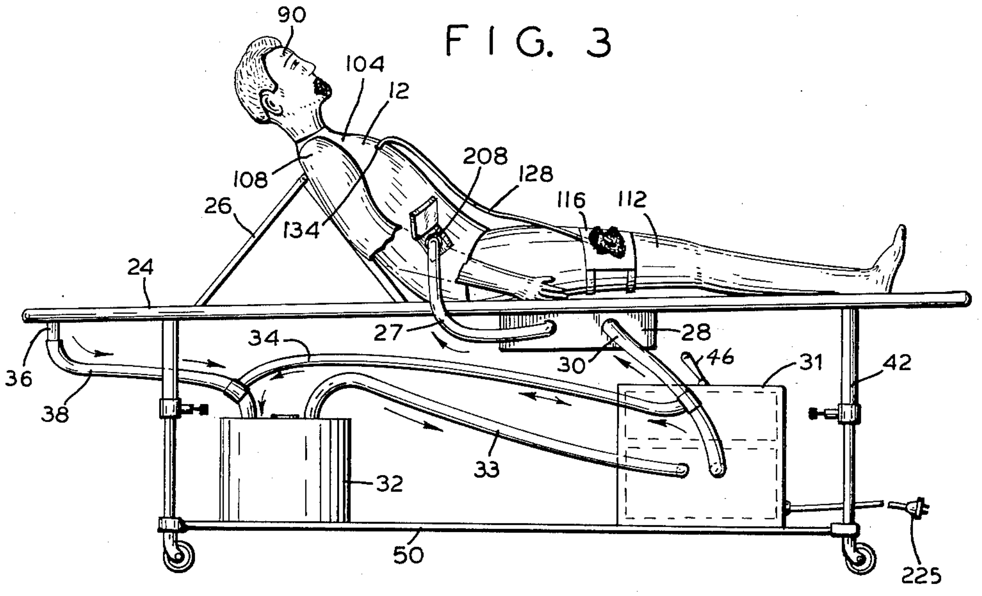
FIG. 3 is a side elevation of the synthetic casualty without clothing and resting upon a table.
Figure 4:
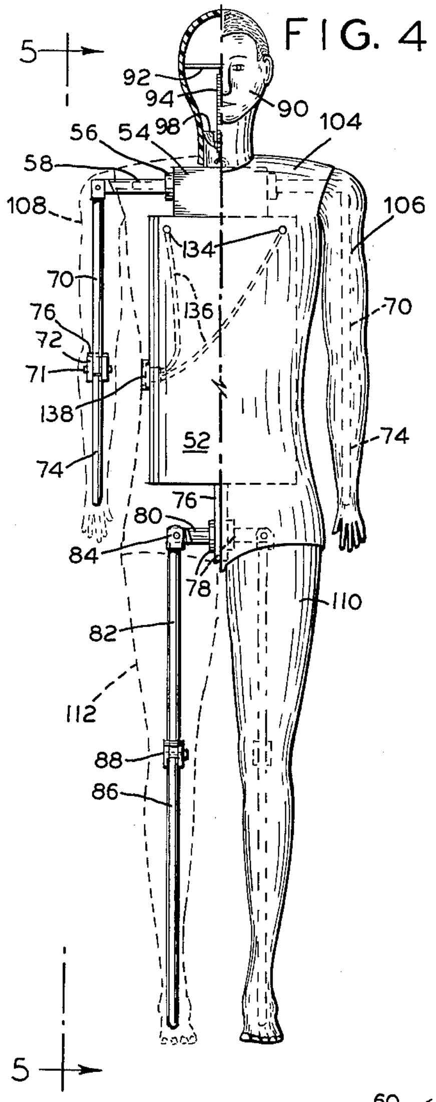
FIG. 4 is a front elevational view of the manikin with a portion of the skin removed to show the frame structure.

A flow control unit 28 controls the quantity and location of blood distribution within the manikin. The blood is pumped to the control unit 28 through another arrangement of tubes 30 which will hereafter be known as the service cord. This service cord is attached to a delivery end of several pumps and driven by electric motors which will be described later, all of which are housed in a unit 31 which will hereafter be known as the mechanical unit. This unit draws blood from a reservoir 32 through suitable tubing 33. A by-pass tube 34 is connected into the service cord in such manner as to divert a portion of the blood taken up by the pump directly back into the reservoir, thus allowing continuous operation of the pumps even though all distribution through the injuries is turned off. If the manikin is lying on a suitable blood gathering tray, such as the table top 24, the blood can be directed toward a suitable drain 36 (FIG. 1) by inclining the table top 24 and causing the blood to run by gravity thereto, whence it is carried back to the storage reservoir 32 by a tube 38. The inclined table top 24 is best seen by reference to FIG. 3, where the angle of incline is controlled by adjustable legs 42.

One of the features of the present invention is the fact that the manikin is not secured to a board or table and therefore can be transported for use as a realistic casualty in the field. It will be noted that the associated units are readily portable inasmuch as the flow control unit 28 is of such dimensions as to fit into an opening 44 in the mechanical unit 31 where it may be transported together with the mechanical unit by a handle 46. The storage reservoir unit 32 is also provided with a handle 48 for portability.

Referring again to FIGS. 1 and 3, the table is provided with a shelf 50 upon which is stored the mechanical unit 31 and blood reservoir 32. The flow control unit is removably hung from the side of the table top 24 and supported in an angular position so that the operating panel 40 is readily accessible to an operator or instructor. The various units, including the manikin, are interconnected with the proper tubes, as described above, ready for use.

Referring now to FIGS. 4 through 10, the manikin is constructed around a frame comprising a body section 52 having an elliptical shape and preferably built from light sheet material such as sheet aluminum. Secured to the top of the body section 52 is a rectangular unit 54 having two opposed protruding bearings 56 for rotatably supporting the arm bearings 58 which carry the arm sections 106 and 108. The bearing 56 is constructed with a flange 59. An angular member 60 of arcuate shape is fastened to the flange 59 in such manner as to form a channel 61 between the flange 59 and the side of the angle 60. The bearing 58 is also provided with a flange 62 having proper thickness and radius to fit into channel 61.

A V shape cut-out 63 in the flange 62 allows the flange 62 to pass over the angle 60 when assembling the bearing 58 upon the bearing 56 in an axial direction. It will now be readily understood that when the bearing 58 is rotated in assembled position with bearing 56, the flange 62 will cooperate in the channel 61, thus preventing the removal of the bearing 58. The flange 62 furthermore has a projection 64 which upon rotation of the bearing 58 hits against the angle 60 thus preventing a complete rotation of the bearing and consequently the arm.

Figures 5, 6, 7, 9, 10:
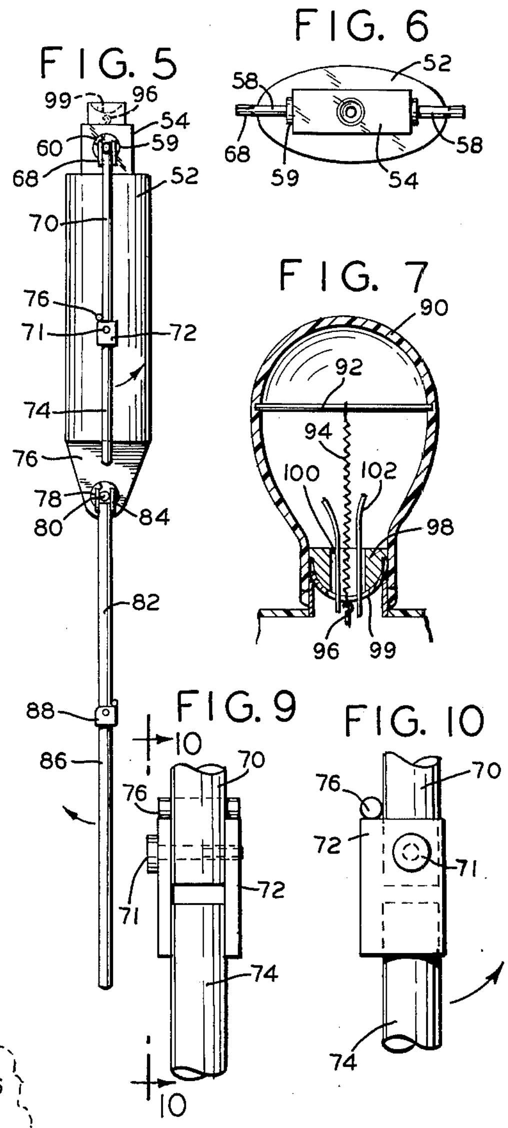
FIG. 5 is a view along line 5—5 of FIG. 4.
FIG. 6 is a top view of the manikin in FIG. 4 with head removed.
FIG. 7 is a sectional view showing the head construction.
FIG. 9 is an elevational view of a typical elbow or knee joint.
FIG. 10 is a view along line 10—10 of FIG. 9.
Figure 8:
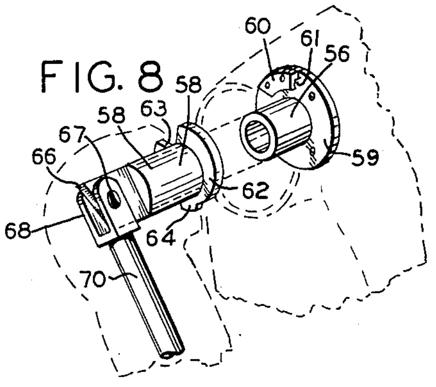
FIG. 8 is a perspective of the shoulder construction.

The bearing 58 has a reduced section 66 having a hole therein to receive a pin 67 for pivotally mounting a yoke 68 secured to the upper end of an arm tube 70. The free end of the arm tube 70 also contains a hole to receive a pivot pin 71. A yoke 72 attached to the upper end of the lower arm tube 74 pivots about pin 71 by which it is attached to the upper arm tube 70. In order to properly simulate the movements at the elbow or knee, rotation about the pivot pin 71 must be restricted. This is accomplished by attaching a pin 76 across the yoke on the top edge adjacent the pivot pin, as best seen by FIGS. 9 and 10.

A depending beam 76 is attached below the lower portion of the body section 52 and positioned centrally therewith. There are two flanged bearings 78 constructed the same as the bearings 56 described above which are attached to the opposed sides of the beam 76 for the purpose of rotatably receiving leg bearings 80. An upper leg tube 82 is pivotally attached to the bearing 80 through a yoke 84 in a manner similar to that described above for the bearing 58. A lower leg tube 86 is pivotally mounted by a yoke 88 to the lower end of the upper leg tube 82 in the same fashion as that described above for the lower arm tube 74. A head section 90 is constructed completely from plastic material. A rod 92 spans the distance between the sides of the head. A spring 94 is secured at one end to the rod 92 and holds the head in position by virtue of the fact that the free end is attached to a hook 96 secured in the upper side of unit 54. The head is pivotally and rotatably mounted by means of a ball-and-socket arrangement comprising a ball element 98 secured within the neck of the head section 90 which is received in a mating socket 99 secured to the upper portion of the unit 54, thus allowing limited movement of the head 90 in all directions. The ball joint 98 furthermore has an opening through the center to allow passage of the spring 94 and blood circulating tubing 102.

The manikin comprises six basic components, the head 90, the torso 104, the arms 106 and 108, the legs 110 and 112, all of which are made from a suitable plastic, such as vinyl foam for the flesh and vinyl plastisol for the skin, to give a life-like appearance. The plastic is moulded around the frame in such a manner as to reproduce the shape of the body member which it is to simulate.

Figure 14:
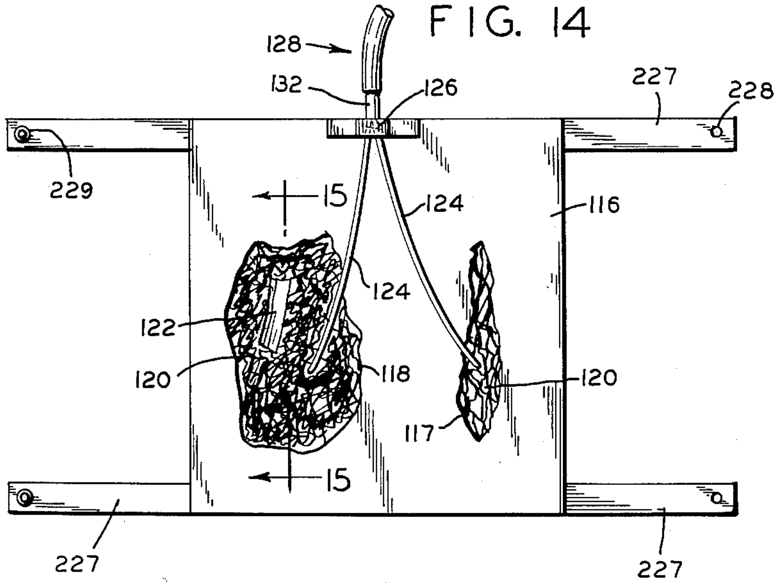
FIG. 14 is a typical moulage assembly.
Figure 15:
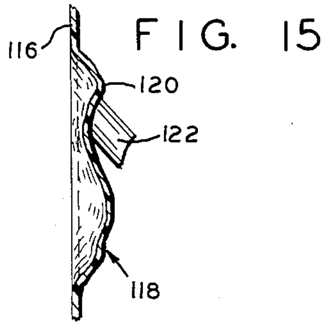
FIG. 15 is a view along line 15—15 of FIG. 14.

An injury of any part of the body is simulated by an attaching member hereinafter identified as a moulage (FIG. 14). The design of the moulage is dependent upon the portion of the manikin where it is designed to simulate a wound. For example, the moulage may be a glove-type arrangement having moulded therein a hand injury. It may also take the form of a flat plastic sheet 116 in which are moulded two injuries 117 and 118. Any type of injury contour can be made, as torn flesh 120 and a severed bone 122.

Figure 13:
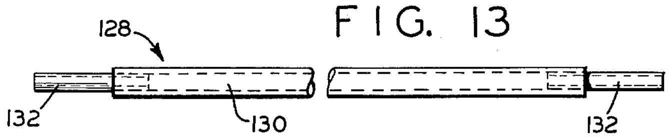
FIG. 13 is a typical moulage blood line.

The moulage 116 is provided with two tubes 124. One tube is attached to each of the injuries 117 and 118 and each tube has open ends to allow blood to run out from the injury. The two tubes 124 terminate in one fitting 126 which receives blood through a moulage blood line 128. The blood line is best shown by FIG. 13 and comprises a flexible plastic tubing 130 provided with a cylindrical fitting 132 in each end and can be of any suitable length. One end of the blood line 128 is inserted in the fitting 126 and the free end is plugged into a moulage port 134 (FIG. 4) in the chest of the manikin. The fitting 132 is made from a suitable plastic and its diameter is slightly oversize with respect to the opening in the mating fitting 126, so that when they are manually forced together the resulting connection is sufficiently tight to prevent leakage of blood.

It will be noted that there are two moulage ports shown, but as many as are required can be provided and in any location where necessary. The ports 134 are fittings such as 126 to receive the mating plug 132 of the blood line and retain it in a leak-proof manner, as described above.

Figure 11:
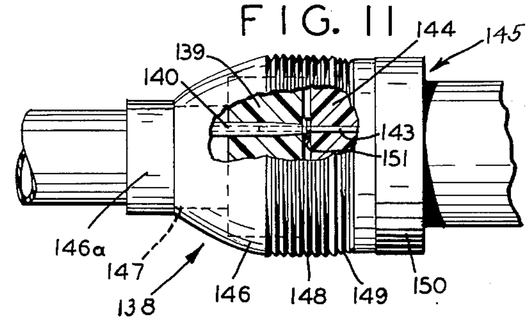
FIG. 11 is an elevational view partly in section of a connector.
Figure 12:
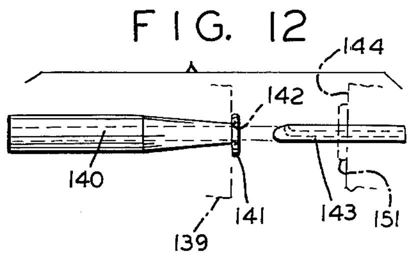
FIG. 12 is an elevational view of a pair of the tubes used in the connector of FIG. 11.

A tubing 136 connects the moulage port 134 with a multi-tube fitting 138 which is shown recessed in the right side of the manikin (FIG. 4), but of course can be located at any convenient point. The multi-tube fitting 138 is a male portion of a connector similar to electrical connectors but employing hollow tubing instead of wires. These fittings will hereafter be identified as connectors. This is best illustrated in FIG. 11 wherein the female portion comprises a block 139 through which a tube 140 projects. A flanged end 141 is designed to provide a proper opening 142 to conveniently receive a male tube 143 which projects through a block 144 of the male portion generally indicated 145 of the connector.

An enclosing shell 146 surrounds the block 139 and is fastened to a reduced portion 147 of the block 139 by a collar 146A. The shell 146 is provided with a threaded portion 148 which projects beyond the surface of the block 139 to receive mating threads 149 on a similar enclosing shell 150 of male section 145 of the connector. The shell 150 is threadably attached to the block 144 so that threads 149 can be screwed into the threads 148 by turning the shell 150. As the threads 149 advance into mating threads 148, the surface of block 144 approaches the surface of block 139 thereby causing an O-ring 151, which surrounds the tube 143, to be compressed between the flange 141 of tube 140 and the surface of block 144, thereby providing a leak-proof joint. While only one set of interconnecting tubes 140 and 143 have been described, it is quite obvious that any number required might be employed, limited only by the size of the connector.

Figure 16:
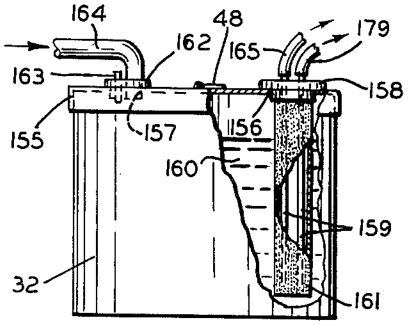
FIG. 16 is an elevational view of a blood storage tank.
Figure 17:
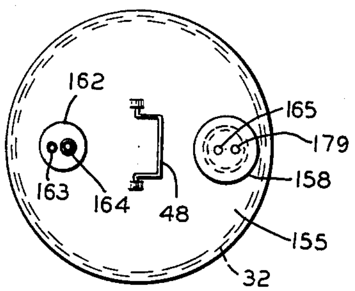
FIG. 17 is a plan view of the tank of FIG. 16.
Figure 21:
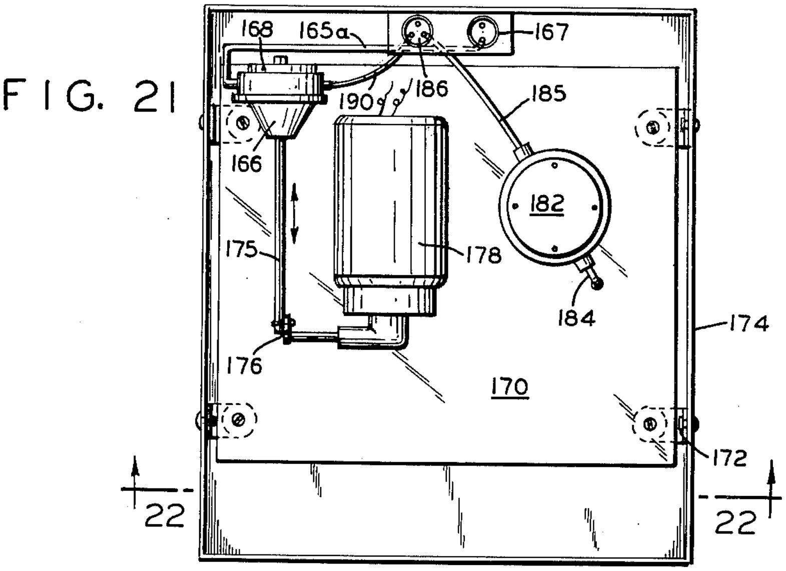
FIG. 21 is a plan view of the inside of the mechanical unit.
Figures 22, 23:
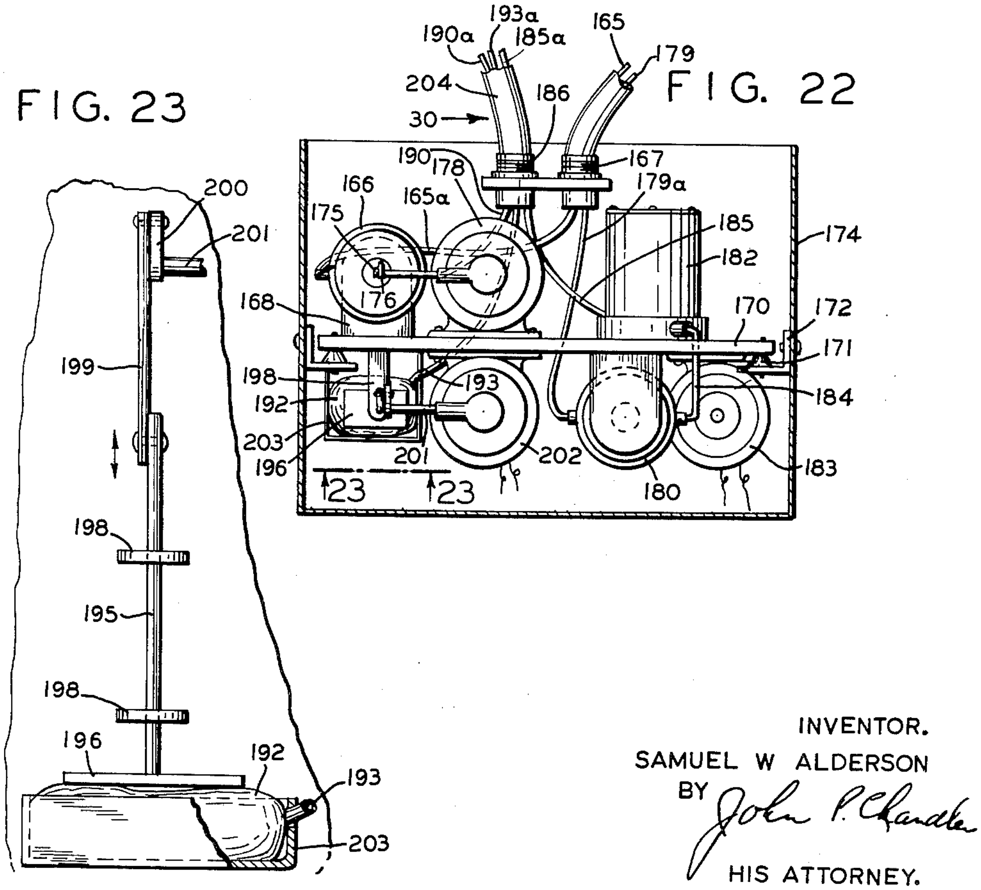
FIG. 22 is a sectional view along line 22—22 of FIG. 21.
FIG. 23 is a view along line 23—23 of FIG. 22.

The blood reservoir can be any suitable container, such as the tank 32 (FIGS. 16 and 17), and provided with a cover 155 which may be securely attached to the tank. Two openings 156 and 157 are provided in the top 155. The opening 156 receives a fitting 158 through which two blood line tubes 159 project. These tubes depend into the synthetic liquid blood 160 and are surrounded by a strainer 161 which is attached at its upper end to the fitting 158. The other opening 157 contains a similar fitting 162 having two holes therein, one for receiving a vent pipe 163 and the other for receiving a blood return pipe 164. A tube 165 connects the upper end of one of the tubes 159 with a pulsating arterial pump 166 (FIGS. 21 and 22) through a connector 167 and lead tube 165A. The pump 166 is mounted upon a bracket 168 on a plate 170 which is resiliently supported upon shock mounts 171 on brackets 172 secured to the walls of a box 174. These, together with other components about to be described, comprise the mechanical unit 31 mentioned above. The pulsating pump 166 is a diaphragm type but may be any suitable type.

It is driven by a reciprocating drive rod 175 which is actuated by a crank 176 on an electric motor 178. The pulsations caused by the reciprocating rod 175 are timed to the equivalent of a heart-beat by reduction gears in the motor 178, or if desired by suitable electrical controls. Another tube 179 connects second tube 159 in the reservoir 32 with a pulsating venous pump 180 through the connector 167 and lead tube 179A. Inasmuch as the venous pump 180 supplies blood to the veins, a practically steady flow of blood is required. This is accomplished by passing the blood through an attenuating ram 182. A second motor 183 drives the venous pump 180 similarly to that described for the arterial pump 166.

Figures 18, 19:
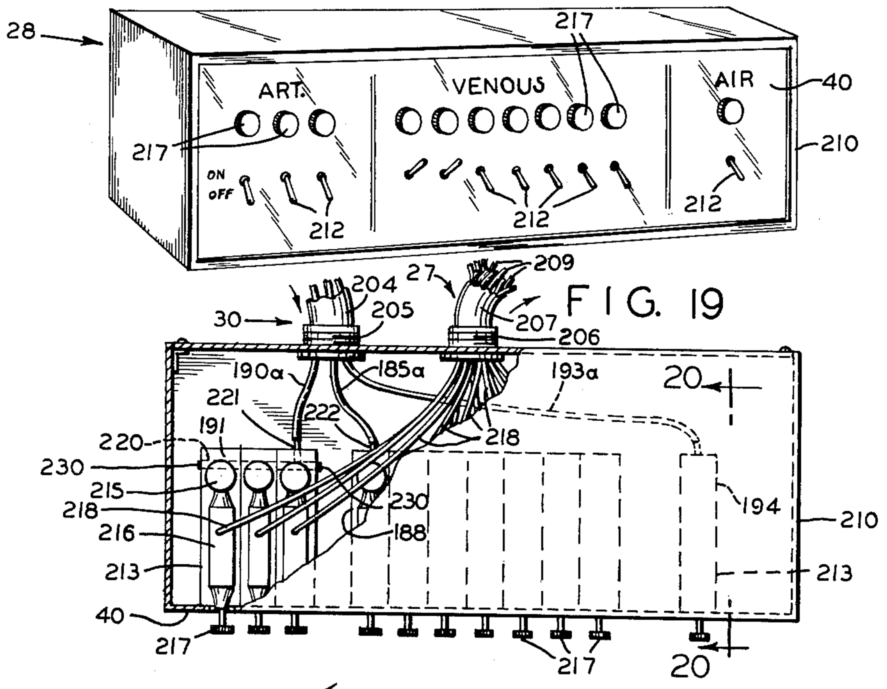
FIG. 18 is a perspective view of the flow control unit.
FIG. 19 is a top view of the control unit of FIG. 18 partly broken away to show the inside components.

To provide compactness and portability, it will be noted that the plate 170 is suspended practically midway in the box 174, thus making allowance for fastening components on the bottom side of the plate, including pump 180 and motor 183. A tube 184 extends from the delivery end of the pump 180 through a hole in plate 170 to the ram 182. Another tube 185 connects the delivery end of ram 182 through a connector 186 and extension tube 185A to a bank of venous control valves 188 (FIG. 19). Similarly, a tube 190 connects the delivery end of the arterial pump 166 with a bank of arterial control valves 191 through the connector 186 and an extension tube 190A. In order to simulate inhale and exhale sounds, such as would accompany chest wounds, a pulsating air supply is provided. This is accomplished by the use of a compressible bag 192 (FIGS. 22 and 23) which is completely enclosed except for one opening where a tube 193 is connected. This tube joins with connector 186 and thence through an extension tube 193A to an air control valve 194 (FIG. 19). The pulsations are produced by the reciprocating movements of a rod 195 at the end of which a plate 196 is attached which alternately squeezes and releases the bag 192, thus simulating exhale and inhale of air through the tubes 193. The rod 195 is journalled in suitable bearings in supports 198 depending below the plate 170. The free end of the rod 195 is attached through a connecting rod 199 to a crank 200 which is driven through shaft 201 and a suitable gear reduction combination (not shown) by a motor 202. The bag 192 is supported in a rectangular box-like support 203 with an open side which also depends from the plate 170.

For the purpose of portability as well as ease of assembly, it will be observed that the various inter-connecting blood carrying tubes, such as 185A and 190A, and the air-carrying tube 193A, are threaded through a plastic casing 204 (FIG. 22) to form the service cord 30 mentioned above. The service cord includes the tubes 185A, 193A and 190A, the surrounding casing 204 and connectors 186 at one end and 205 at the opposite end (FIG. 19). This cord 30 can be disconnected for transporting by unscrewing the connector shell 150, described above, and pulling it apart, similar to an electrical connector. The umbilical cord 27 is constructed in the same manner, with the connectors 206 and 208 (FIG. 3) casing 207, arterial and venous blood tubings and air-carrying tubing 209. It will be understood that the connectors are constructed with a keying device, such as a pin, protruding from the male portion and received in a hole in the female portion (not shown), in order that after disassembly of the cords 26 and 30 they may be re-assembled in the same position.

Figure 20:
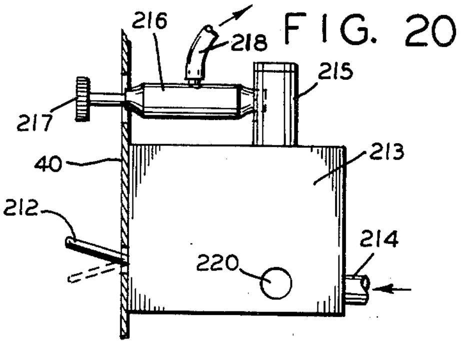
FIG. 20 is a view along line 20—20 of FIG. 19.

The flow control unit 28 is housed in a suitable container 210 with panel 40 upon which the arterial bank of controls is indicated, as is the venous and the air controls. A lever 212 projecting through the panel 40 actuates the On-Off valve 213 which is mounted directly behind the panel 40, as best shown in FIGS. 19 and 20. This valve receives air through inlet 214 and if the lever 212 is in "On" position, air passes through exhaust tube 215 and into a needle valve 216 which has an adjusting knob 217 also protruding through panel 40 to control the quantity which passes out through a tube 218 to be ultimately delivered to any injury.

While the above description concerns the air controlled valves, the blood control valves are constructed and operate in the same manner with the exception that when valves 213 are banked together to form the arterial section and venous section, a side opening 220 is used to allow blood to flow into each adjacent valve, thereby requiring only one inlet 221 for the complete bank of arterial valves and one outlet 222 for the complete bank of venous valves. Opening or passage 220 is therefore a header communicating with each of the several arterial valves.

Opening 220 has plugs 230 at its ends for cleaning purposes. It will be noted from FIG. 3 that the moulage 116 is secured to the leg of the manikin by means of straps 227 having complementary fastening means 228 and 229 at their ends. The mouth injury shown at 232 in FIG. 1 may be serviced in the same manner as earlier described with respect to the other injuries. Current is supplied to the unit 31 through cord and plug 225 and a switch 226 is used to turn the power on and off.

What I claim is:

1. A manikin for use in first aid training and comprising an articulated body comprising a torso, head, arms and legs which are independently pivotally movable to an adjusted, fixed position to simulate a lifelike appearance and provided with a plurality of simulated injuries, a reservoir for a fluid simulating blood and a group of tubes for delivering the fluid to the several injuries, a conduit connecting the reservoir with said tubes and providing a fluid circuit, a pumping unit in said fluid circuit for imparting differing types of flow to the fluid, a system of valves for discontinuing flow to any one of the injuries and for varying the amount of fluid delivered to each injury and a by-pass tube connecting the discharge side of the pumping unit with its reservoir.

2. The structure recited in claim 1 wherein the head is mounted at the upper end of the torso by a ball-and-socket structure and a spring urges the ball member into the socket structure.

3. The structure recited in claim 1 wherein the manikin is formed of vinyl foam for the flesh with a covering of vinyl plastisol simulating the skin.

References Cited in the file of this patent

UNITED STATES PATENTS 849,482 Machlet ---------------- Apr. 9, 1907

2,324,702 Hoffmann et al. --------- July 20, 1943
2,483,034 Braeg ----------------- Sept. 27, 1949
2,533,640 Ulrich ----------------- Dec. 12, 1950
2,551,560 Graves ----------------- May 1, 1951
2,752,697 Lawall ----------------- July 3, 1956
2,871,579 Niiranen ---------------- Feb. 3, 1959

FOREIGN PATENTS 323,347 Switzerland ------------ Sept. 14, 1957